(12) United States Patent
Kapocs et al.

(10) Patent No.: US 12,403,871 B2
(45) Date of Patent: Sep. 2, 2025

(54) PEDAL ASSEMBLY FOR A VEHICLE

(71) Applicant: Volvo Car Corporation, Gothenburg (SE)

(72) Inventors: Marcel Kapocs, Gothenburg (SE); Mickael Larsen, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/422,413

(22) Filed: Jan. 25, 2024

(65) Prior Publication Data

US 2024/0253601 A1 Aug. 1, 2024

(30) Foreign Application Priority Data

Jan. 27, 2023 (EP) ..................... 23153766

(51) Int. Cl.
*B60T 7/04* (2006.01)
*G05G 1/38* (2008.04)
*G05G 1/42* (2008.04)

(52) U.S. Cl.
CPC ............... *B60T 7/042* (2013.01); *G05G 1/42* (2013.01); *G05G 1/38* (2013.01)

(58) Field of Classification Search
CPC .................................. G05G 1/42; G05G 1/38
See application file for complete search history.

(56) References Cited

U.S. PATENT DOCUMENTS

| 4,991,457 A | * | 2/1991 | Chen | ................... F16H 59/0213 |
| | | | | 403/50 |
| 5,309,361 A | * | 5/1994 | Drott | ...................... B60T 7/042 |
| | | | | 74/513 |
| 2021/0004040 A1 | | 1/2021 | Dohmen et al. | |
| 2022/0048384 A1 | * | 2/2022 | Kim | .................. B60K 26/02 |
| 2023/0195156 A1 | * | 6/2023 | Kim | ........................ G05G 5/03 |
| | | | | 74/512 |

FOREIGN PATENT DOCUMENTS

| DE | 102014103167 A1 | * | 9/2015 | ............. B60K 26/02 |
| EP | 0500888 B1 | | 1/1996 | |
| GB | 375591 A | * | 6/1932 | |

OTHER PUBLICATIONS

Search report issued for EP Application No. 23153766.3, mailed on Jul. 26, 2023, 8 pages.

* cited by examiner

*Primary Examiner* — Daniel D Yabut
(74) *Attorney, Agent, or Firm* — Raj S. Dave; Dave Law Group LLC (57) ABSTRACT

According to an embodiment, it is a pedal assembly comprising a mounting bracket comprising a mounting interface for mechanically attaching the pedal assembly to a structural part of the vehicle, a guide part being fixedly connected to the mounting bracket and comprising a channel extending linearly along a channel axis, an actuation rod extending along a rod axis and having a first end comprising or being coupled to a pushing surface, wherein at least a portion of the actuation rod is located inside the channel, wherein the rod axis and the channel axis are parallel and the pushing surface is configured to be contacted by a human foot for operating the pedal assembly, and a sensor assembly configured to detect an actuation of the actuation rod along the rod axis, wherein the pedal assembly is a component of a drive-by-wire system of the vehicle.

18 Claims, 8 Drawing Sheets

PEDAL ASSEMBLY FOR A VEHICLE

CROSS-REFERENCE TO RELATED APPLICATIONS

This application claims the benefit of EP Patent Application No. 23153766.3, filed on Jan. 27, 2023, which is hereby incorporated by reference in its entirety.

FIELD OF INVENTION

The present disclosure relates to a pedal assembly for a vehicle, and more particularly a pedal assembly for use in a drive-by-wire system.

BACKGROUND

When a pedal assembly is used as a part of a drive-by-wire system, the pedal assembly and the components of the vehicle being configured to provide the functionality being controlled by the operation of the pedal assembly are only coupled by electric means, e.g., electric wires. In other words, in a drive-by-wire system, the pedal assembly is not mechanically coupled to the components of the vehicle being configured to provide the functionality being controlled by the operation of the pedal assembly.

Therefore, there is a need to improve known pedal assemblies, particularly pedal assemblies used in drive-by-wire systems so as to make them structurally simple and compact.

SUMMARY

The present disclosure relates to a pedal assembly for a vehicle.

The present disclosure also is directed to a drive-by-wire system for a vehicle.

Moreover, the present disclosure relates to a vehicle comprising such a pedal assembly and/or a drive-by-wire system.

In a vehicle being driven by a human driver, a pedal assembly is one of the standard means being used by the human driver for operating the vehicle. The pedal assembly is for example a brake pedal assembly. The human driver can operate the vehicle's brakes by manipulating the brake pedal assembly. Alternatively, the pedal assembly may be an accelerator pedal assembly. The human driver can adjust an acceleration of the vehicle by manipulating the accelerator pedal assembly. The pedal assembly can also be a drive pedal assembly. A drive pedal assembly may be operated in order to adjust an acceleration of the vehicle. In this respect, the drive pedal assembly offers the same functionality as an accelerator pedal assembly. However, using a drive pedal assembly, the vehicle may also be decelerated. Thus, the drive pedal assembly additionally may offer a functionality which is otherwise provided by a brake pedal assembly.

The pedal assembly may be mechanically coupled to the components of the vehicle being configured to provide the functionality being controlled by the operation of the pedal assembly. Thus, the pedal assembly may be mechanically connected to a brake system of the vehicle or to an engine of the vehicle.

Alternatively, if the pedal assembly is used as a part of a drive-by-wire system, the pedal assembly and the components of the vehicle being configured to provide the functionality being controlled by the operation of the pedal assembly are only coupled by electric means, e.g., electric wires. In other words, in a drive-by-wire system, the pedal assembly is not mechanically coupled to the components of the vehicle being configured to provide the functionality being controlled by the operation of the pedal assembly.

It is an objective of the present disclosure to improve known pedal assemblies. This is especially the case for pedal assemblies being used in drive-by-wire systems. The pedal assembly shall be structurally simple and compact.

The problem is at least partially solved or alleviated by the subject matter of the independent claims of the present disclosure, wherein further examples are incorporated in the dependent claims.

According to a first aspect, there is provided a pedal assembly for a vehicle. The pedal assembly comprises a mounting bracket having a mounting interface for mechanically attaching the pedal assembly to a structural part of the vehicle. Moreover, the pedal assembly comprises a guide part being fixedly connected to the mounting bracket and comprising a channel extending linearly along a channel axis. Additionally, the pedal assembly comprises an actuation rod extending along a rod axis and having a first end comprising or being coupled to a pushing surface. At least a portion of the actuation rod is located inside the channel. The rod axis and the channel axis are parallel, and the pushing surface is configured to be contacted by a human foot for operating the pedal assembly. Furthermore, the pedal assembly comprises a sensor assembly being configured to detect an actuation of the actuation rod along the rod axis. Using the mounting bracket, the pedal assembly may be mechanically attached to the structural part of the vehicle in a simple and reliable manner. The mounting bracket may be configured to be mechanically attached to a floor component of the vehicle or a dashboard carrier component of the vehicle. The actuation rod having at least a portion thereof, e.g., its second end, located inside the linearly extending channel and the guide part are structurally simple. These parts offer a simple and compact actuation mechanism of the pedal assembly. In this context, the actuation rod and the guide part may be movable with respect to one another along the rod axis and the channel axis only. This means that the actuation rod may be moved along a linear trajectory when operating the pedal assembly. The channel and the guide part as a whole guide this movement. In an alternative, the actuation rod may be fixedly connected to the guide part such that a relative movement of the actuation rod with respect to the guide part is not possible. In both alternatives, the sensor assembly may detect an actuation of the actuation rod along the rod axis. This means that, using the sensor assembly, one may detect whether a user of the pedal assembly pushes the actuation rod via the pushing surface or not. At the same time a pushing intensity may be detected. The detection result of the sensor assembly may be used as a control input for a drive-by wire system. Moreover, in both alternatives, the pedal assembly is structurally simple. It comprises only comparatively few parts. Additionally, the pedal assembly is very compact.

The basic idea underlying the present disclosure is to provide a pedal assembly, wherein the part of the pedal assembly that is actuated by a user of the pedal assembly, in the present disclosure the actuation rod, either perform a purely linear movement with respect to the part of the pedal assembly being fixedly arranged on the vehicle structure or no movement at all. In the present disclosure, the part being fixedly arranged on the vehicle structure is the guide part. Especially when considering known pedal assemblies comprising a plurality of levers being pivotably supported on one another or on a part being fixedly arranged on the vehicle structure, the pedal assembly according to the present disclosure is structurally simple and compact.

In the present context, the channel is to be understood as an elongated volume having a length being at least three times the diameter. In an alternative, a length of the channel is at least five times the diameter. Such a channel can reliably guide the actuation rod when being actuated along the rod axis. In a case in which the actuation rod is not movable, the channel ensures that a reliable sensor signal is produced.

It is understood that the pushing surface is the surface of the pedal assembly on which a user of the pedal assembly presses his or her foot in order to operate the pedal assembly. In a first alternative, the actuation rod comprises the pushing surface. This means that the actuation rod and the pushing surface are formed integrally. In this context, the actuation rod may comprise a plate-shaped portion at its first end. The pushing surface may be an end face of the plate-shaped portion. Alternatively, the pushing surface may simply be an end face of the actuation rod's first end. In a further alternative, the actuation rod is coupled to the pushing surface. This means that the pushing surface is provided on a part being separate from the actuation rod. Such a part may be called a thrust piece. This part is connected to the first end of the actuation rod. The part may be plate-shaped. The part may be connected to the first end of the actuation rod by any suitable means. In an example, the part is connected to the first end of the actuation rod via a clip. In another example, the part is glued or screwed to the first end of the actuation rod.

It is noted that the mounting bracket and the guide part may be provided as parts being separate from one another which are connected by an appropriate means when forming the pedal assembly. The mounting bracket and the guide part may for example be connected by one or more welding seams, by one or more screws or by one or more clips. Alternatively, the mounting bracket and the guide part may be formed as a single integral part. This means that the mounting bracket is formed as one portion of this single integral part, and the guide part is formed as another portion of the same single integral part.

In an example, the pedal assembly is a brake pedal assembly. Thus, the detection result of the sensor assembly may be used as a control input for a brake system of the vehicle. As has been mentioned before, such a pedal assembly is structurally simple and very compact.

In an example, the guide part comprises a support element. The support element is arranged in the channel. The actuation rod is axially supported on the support element. It is noted that the support element may be arranged at an end of the channel or at an intermediate position, i.e., between the ends of the channel. The support of the actuation rod on the support element may be direct, i.e., the actuation rod may directly contact the support element, or indirect, i.e., the actuation rod is supported on the support element via one or more intermediate parts. Providing such a support element is a simple and reliable way to support the actuation rod.

The support element is for example disc-shaped. Such a support element is compact.

In an example, the support element comprises an opening and the actuation rod extends through the opening. The portion of the actuation rod extending through the opening may have a reduced diameter with respect to the remaining portions of the actuation rod. This configuration allows the sensor assembly to be located on an opposite side of the support element as the pushing surface. This has the effect that the sensor element is located in a protected region of the pedal assembly. Thereby, the sensor assembly may be operated in a precise and reliable manner.

Furthermore, in a configuration in which the actuation rod extends through the opening, an abutment surface defining an extreme position of the actuation rod may be provided on both sides of the support element. In other words, both sides of the support element may be used to limit a range of motion of the actuation rod along the rod axis.

In an example, the support element comprises at least one predetermined breaking zone. In this context, a predetermined breaking zone is defined as a zone of the support element offering a predetermined mechanical resistance or mechanical stability being lower than the mechanical resistance or mechanical stability of the adjacent parts. This has the effect that in a situation in which a very high force is applied on the actuation rod, the predetermined breaking zone will be mechanically deformed or mechanically broken whereas the remaining parts of the pedal assembly remain mechanically intact. This is helpful in a situation in which the vehicle comprising the pedal assembly is involved in an accident or a crash. Due to the high forces to which the pedal assembly and especially the actuation rod may be subject in such a situation, the predetermined breaking zone will be mechanically deformed or mechanically broken such that a range of movement of the actuation rod is increased. Consequently, in such a situation, more room may be offered for the feet of the user of the pedal assembly. This increases crash safety for the user.

In an example, the predetermined breaking zone comprises a plurality of slots. This means that the predetermined breaking zone is mechanically weakened by the plurality of slots. Using such slots, a mechanical resistance or mechanical stability may be adjusted in a precise and simple manner. Beyond that, a support element comprising a plurality of slots may be manufactured in a simple and cost-efficient manner.

In an example, the pedal assembly further comprises a biasing element biasing the actuation rod into an unactuated position. This has two effects. A first effect relates to the fact that, due to the biasing element, the actuation rod always assumes the unactuated position if no operational force acts thereon. Thus, the actuation rod always assumes a defined position such that the pedal assembly may be operated in a reliable manner. The second effect relates to the fact that the biasing element may provide a counterforce when being compressed during operation of the pedal assembly. This counterforce helps the user of the pedal assembly to precisely operate the pedal assembly.

In an example, the biasing element comprises a spring element. The spring element may comprise a wound coil spring and/or an elastomeric spring element.

In an example, the biasing element is supported on the support element. Thus, the biasing element is mechanically arranged between the actuation rod and the support element. In this context, the rod may be supported on the support element via the biasing element. This is a structurally simple and reliable configuration.

In an example, the actuation rod comprises an abutment element being configured to abut against the guide part in an unactuated position of the actuation rod. In this context, the abutment element of the actuation rod may abut against the support element of the guide part. Consequently, the actuation rod may assume a well-defined position when being unactuated.

In an example, the sensor assembly comprises a travel sensor being configured to detect a displacement of the actuation rod. Additionally, or alternatively, the sensor assembly comprises a force sensor being configured to detect a force being applied to the actuation rod. Both the travel sensor and the force sensor allow to reliably detect an actuation of the pedal assembly, more precisely the actuation rod. Thus, a system which is operated using the pedal assembly may be controlled in a precise manner. It is noted that the use of a travel sensor implies that the actuation rod moves relative to the guide part when being actuated. This is in contrast to the use of a force sensor which may be used in combination with a configuration in which the actuation rod may move relative to the guide part and also in combination with a configuration in which the actuation rod is not movable with respect to the guide part.

In an example, the pedal assembly further comprises a scaling means being connected to the actuation rod and the guide part or the mounting bracket such that a contact region between the actuation rod and the guide part is protected against environmental influences. The sealing means may be effective in two directions. This means that influences resulting from a passenger compartment of the vehicle are not affecting the contact region between the actuation rod and the guide part. This especially applies to dirt and humidity which may be present in the passenger compartment. At the same time, the sealing means has the effect that influences from the interior of the pedal assembly and/or parts to which it is connected cannot reach the passenger compartment. This especially relates to dirt and lubrication means.

In an example, the scaling means is sleeve-shaped and extends around a circumference of the actuation rod and the guide part. Consequently, the sealing means protects the contact region between the actuation rod and the gate part from all sides. In other words, the sealing effect is highly reliable.

In this context, the sleeve-shaped scaling means may be a scaling bellow. Thus, the reliability of the sealing effect is not affected by a relative movement between the actuation rod and the guide part.

In an example, the pedal assembly further comprises a retraction actuator being coupled to the guide part or the mounting bracket and being configured to selectively move the actuation rod towards an interior of the channel. The retraction actuator may be configured to move the actuation rod from an unactuated position into a retracted position wherein in the retracted position a manipulation of the actuation rod by a user's foot may not be possible anymore. The retraction actuator is very useful if the pedal assembly is used in a vehicle being able to drive in a fully or partially autonomous mode, wherein in the fully or partially autonomous drive mode a use of the pedal assembly is not required. If, in such a situation, the actuation rod is moved further into the channel, the pushing surface is moved away from a user's foot. This means that more space is provided for the user's foot in case the pedal assembly is not needed. Altogether, user comfort is enhanced.

According to a second aspect, there is provided a drive-by-wire system for a vehicle comprising a pedal assembly according to the present disclosure. In a case in which the pedal assembly is a brake pedal assembly, the drive-by-wire system is a brake-by-wire system. Due to the fact that the pedal assembly is structurally simple and compact, the drive-by-wire system is also structurally simple and compact. Beyond that, all the effects and advantages that have been mentioned in connection with the pedal assembly according to the present disclosure also apply to the drive-by-wire system according to the present disclosure and vice versa.

According to a third aspect, there is provided a vehicle comprising a drive by-wire system according to the present disclosure and/or a pedal assembly according to the present disclosure. The fact that the pedal assembly and/or the drive-by-wire system is structurally simple, also applies to the vehicle as such. Moreover, due to the fact that the pedal assembly and/or the drive-by-wire system is compact, the pedal assembly and/or the drive-by-wire system requires comparatively little space in the vehicle. This characteristic may be used to design the vehicle in a compact manner. Additionally, or alternatively, this allows the vehicle to be designed in a manner that offers a comparatively large space to its users. Beyond that, all the effects and advantages that have been mentioned in connection with the pedal assembly and/or the drive-by-wire system also apply to the vehicle and vice versa.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

The Figures are merely schematic representations and serve only to illustrate examples of the disclosure. Identical or equivalent elements are in principle provided with the same reference signs.

DETAILED DESCRIPTION

Figure 1:
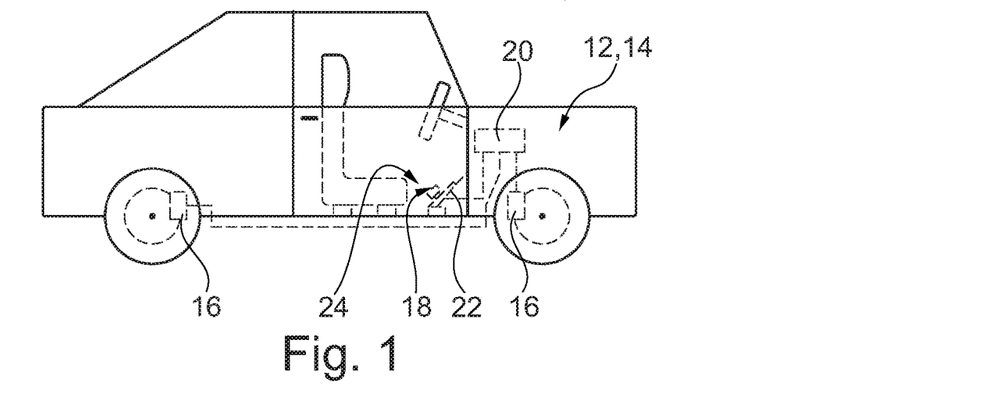
FIG. 1 shows a vehicle according to the present disclosure comprising a drive-by-wire system according to the present disclosure and a pedal assembly according to the present disclosure.

FIG. 1 shows a vehicle 10.

In the present example, the vehicle 10 is a battery electric vehicle.

The vehicle comprises a drive-by-wire system 12 which in the present example is a brake-by-wire system 14.

The brake-by-wire system 14 comprises a brake actuator 16 for each of the vehicle's wheels, a pedal assembly 18 and a control unit 20.

In the present example, the pedal assembly 18 may be called a brake pedal assembly.

The pedal assembly 18 is communicatively connected to the control unit 20. Also, the brake actuators 16 are communicatively connected to the control unit 20. In both cases, the communicative connection is realized by electric wires.

Consequently, using the control unit 20, the brake actuators 16 can be operated as a function of a position of the pedal assembly 18.

It is noted that in the present example, the vehicle 10 additionally comprises an electric accelerator pedal 22. However, in the following, the explanation will focus on the pedal assembly 18, i.e., the brake pedal assembly.

Figure 2:
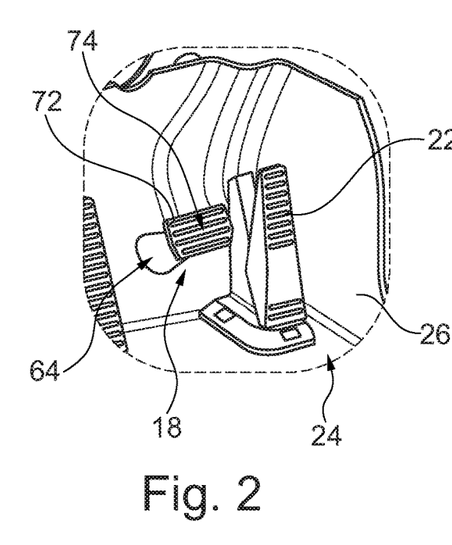
FIG. 2 shows a portion of a footwell area of the vehicle of FIG. 1 in a more detailed view.
Figure 3:
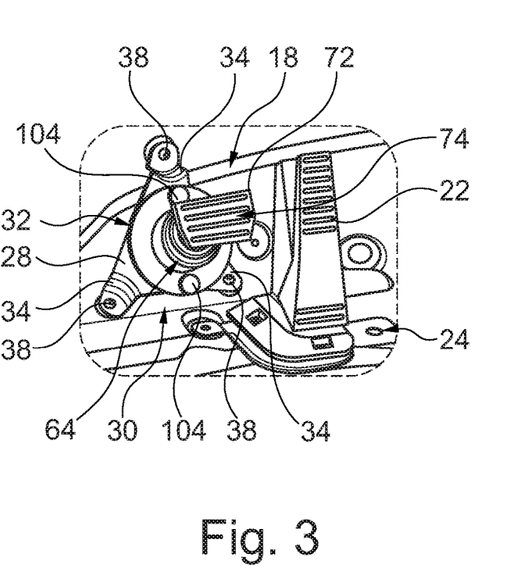
FIG. 3 shows the portion of the footwell area of FIG. 2, wherein a carpet is not shown.

FIGS. 2 and 3 show a footwell area 24 of the vehicle 10 comprising the pedal assembly 18 and the electric accelerator pedal 22 in more detail.

In FIG. 2, a portion of the pedal assembly 18 and a portion of the electric accelerator pedal 22 is covered by a carpet 26 covering a floor area of the footwell area 24.

In FIG. 3, the carpet 26 is not represented in order to better illustrate the pedal assembly 18 and the electric accelerator pedal 22.

A first example of the pedal assembly 18 will be explained with reference to FIGS. 4 to 8.

The pedal assembly 18 comprises a mounting bracket 28 having a mounting interface 30 for mechanically attaching the pedal assembly 18 to a structural part of the vehicle 10.

In the present example, the structural part of the vehicle 10 is a dashboard carrier.

Moreover, in the present example, the mounting bracket 28 comprises a central carrier portion 32 and a total of three leg portions 34.

The mounting bracket 28 is made of a flat material, wherein the three leg portions 34 are bent with respect to the central carrier portion 32 such that the ends of the three leg portions 34 are offset with respect to the central carrier portion 32.

Each of the three leg portions 34 comprises an opening 36 such that the mounting bracket 28 can be connected to the structural part of the vehicle 10 using bolts 38 extending through the openings 36 (see especially FIG. 3).

Figure 4:
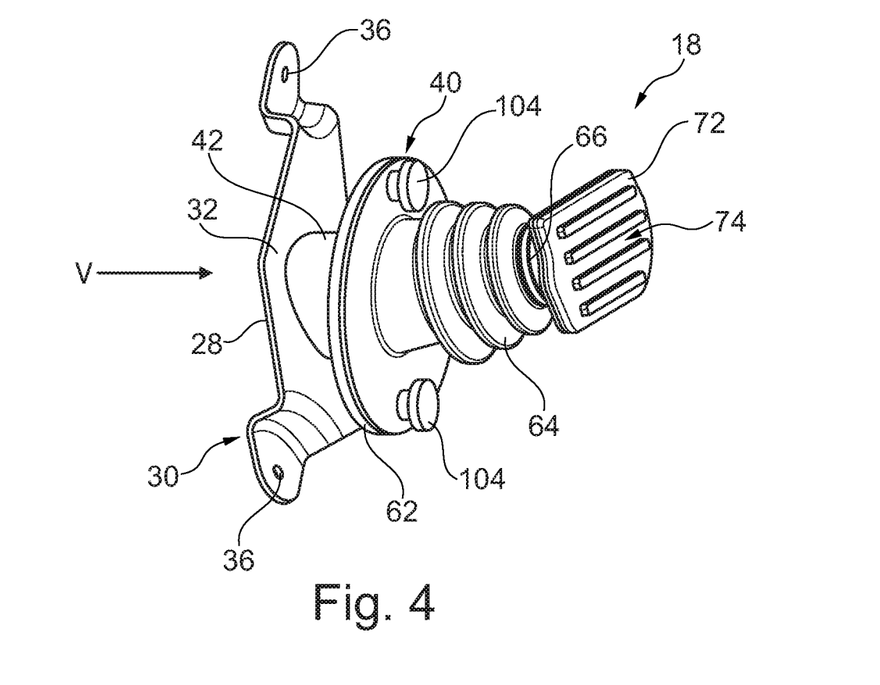
FIG. 4 shows the pedal assembly of FIGS. 1 to 3 in a more detailed, separate view.
Figure 5:
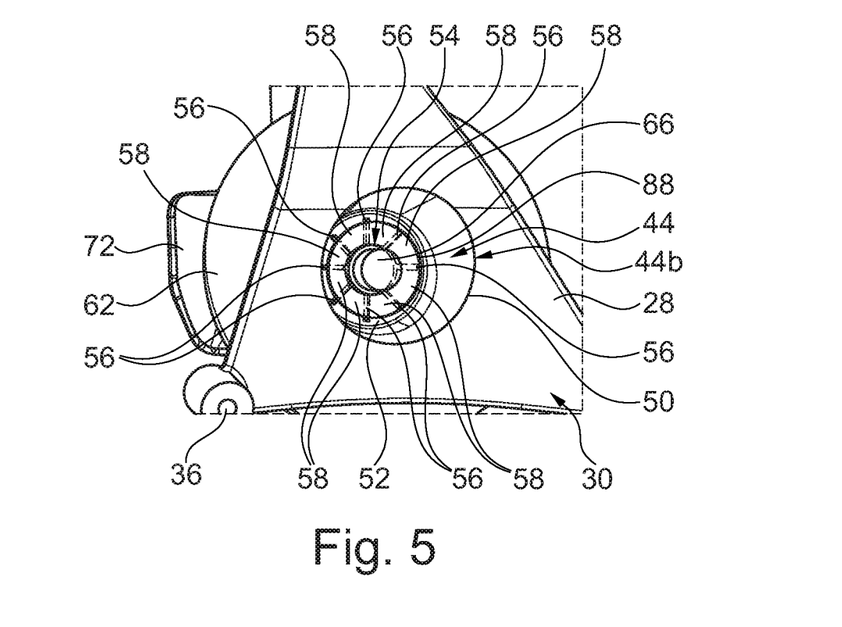
FIG. 5 shows the pedal assembly of FIG. 4 along a viewing direction V in FIG. 4.

Altogether, the mounting bracket 28 has a triangular shape wherein each of the three leg portions 34 is arranged in a corner of the triangular shape.

Figure 6:
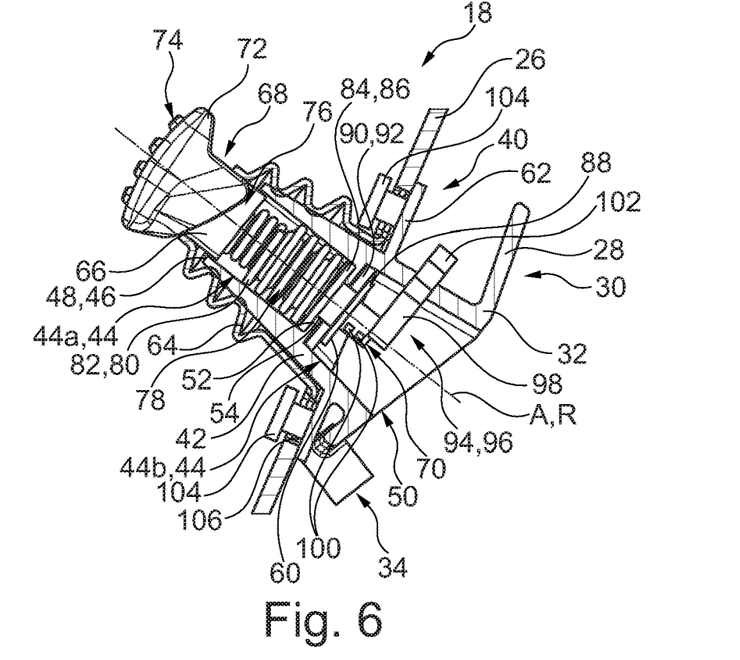
FIG. 6 shows the pedal assembly of FIGS. 1 to 5 in a sectional view, wherein the pedal assembly is in an unactuated state.

The pedal assembly 18 also comprises a guide part 40 which in the present example is formed integrally with the mounting bracket 28. This means that in the present example, the mounting bracket 28 and the guide part 40 are formed as portions of one single part.

Due to the integral configuration, the guide part 40 is fixedly connected to the mounting bracket 28.

It is understood that it is also possible to fixedly connect the guide part 40 to the mounting bracket 28 other than integrally forming those two parts. In a case in which the mounting bracket 28 and the guide part 40 are formed as separate parts, they can for example be fixedly connected by welding or gluing or screwing.

The guide part 40 comprises a main body 42 which in the present example is shaped as a truncated conc.

As shown in detail in FIG. 6, the main body 42 is hollow and comprises a channel 44 extending linearly along a channel axis A. The channel axis A substantially corresponds to a middle axis of the truncated conc.

The channel 44 has a first portion 44a with a cylindrical shape and a second portion 44b shaped as a truncated conc.

At a first axial end 46, the channel 44 is open. This means that the first axial end 46 of the channel 44 is formed as an opening 48 having essentially the same diameter and cross-section as the first portion 44a of the channel 44.

At a second axial end 50 of the channel 44, the channel 44 is also open.

The first portion 44a and the second portion 44b are separated by a support element 52. Thus, the support element 52 limits the first portion 44a and the second portion 44b in a direction parallel to the channel axis A.

The support element 52 is shaped as a ring disc.

Since such a ring disc has an opening 54 at its center, it only limits the channel portions 44a, 44b partially in the axial direction.

An outer perimeter of the ring disc-shaped support element 52 is connected to a wall of the channel 44.

In the present example, the support element 52 forms an integral part of the guide part 40. This means that the main body 42 and the support element 52 are formed by a single part.

As shown in FIG. 5 the support element 52 further comprises a plurality of slots 56 extending radially from the opening 54 towards a perimeter of the support element 52.

In the present example, the slots 56 merge into the opening 54, but end before having reached the outer perimeter of the support element 52.

Moreover, the slots 56 are evenly distributed over a circumference of the support element 52. Consequently, the slots 56 are arranged in a star shape.

Due to the fact that the slots 56 merge into the opening 54, tongues 58 of a substantially triangular form are formed between neighboring slots 56.

The tongues 58 and the slots 56 form a predetermined breaking zone 60 (shown in FIG. 6). The use and purpose of this predetermined breaking zone 60 will be explained further below.

It is understood that due to the fact that the slots 56 are provided in the support element 52, the support element 52 is mechanically weakened when compared to a support element 52 without slots 56.

The guide part 40 additionally comprises a connection collar 62 at its outer circumference.

The connection collar 62 is ring-shaped. It is used to attach the carpet 26 and a sealing means 64 to the guide part 40 as will be explained further below.

Also, the connection collar 62 is integrally formed with the main body 42 in the present example.

The connection collar 62 is offset from the mounting bracket 28 along the middle axis of the main body 42.

Moreover, the connection collar 62 is arranged at an angle with respect to the mounting bracket 28. This means that the connection collar 62 and the mounting bracket 28 are non-parallel.

In the present example, the connection collar 62 and the mounting bracket 28 enclose an angle of approximately 30° (see especially FIG. 6).

Additionally, the pedal assembly 18 comprises an actuation rod 66.

The actuation rod 66 is an elongated part which extends along a rod axis R.

In a situation in which the actuation rod 66 is mounted within the pedal assembly 18, the rod axis R extends in parallel to the channel axis A. More precisely, the channel axis A and the rod axis R coincide.

In the present example, the actuation rod 66 comprises a plurality of cylindrical sections wherein each of the cylindrical sections has a substantially circular cross-section.

The actuation rod 66 has a first end 68 which is an axial end and a second end 70 which also is an axial end. The second end 70 and the first end 68 are arranged on opposite sides of the actuation rod 66.

A thrust piece 72 comprising a pushing surface 74 being configured to be contacted by a human foot for operating the pedal assembly 18 is coupled to the first end 68 of the actuation rod 66.

This means that the pushing surface 74 is coupled to the first end 68 of the actuation rod 66.

Adjacent to the first end 68, the actuation rod 66 comprises a first axial section 76 of a first diameter meter.

In between an end of the first axial section 76 being opposed to the first end 68 of the actuation rod 66 and the second end 70, the actuation rod 66 comprises a second axial section 78 of a second diameter. The second diameter is smaller than the first diameter.

The second end 70, the second axial section 78 and a portion of the first axial section 76 are arranged inside the channel 44.

The actuation rod 66 is supported on the support element 52 via a biasing element 80 which in the present example is a wound coil spring 82. More generally speaking, the actuation rod 66 is axially supported on the support element 52 in an indirect manner.

The biasing element 80 biases the actuation rod 66 towards its unactuated position as shown in FIG. 6 and as will be explained further below.

In other words, the biasing element 80 or wound coil spring 82 is interposed between the support element 52 and the first axial section 76 of the actuation rod 66. In this context, the biasing element 80 or wound coil spring 82 abuts against the support element 52 and the first axial section 76 in an axial direction.

Additionally, a dampening means 84 is interposed between the wound coil spring 82 and the support element 52.

In the present example, the dampening means 84 is a ring-shaped rubber disc 86.

The dampening means 84 is configured to dampen an abutment of the first axial section 76 or the wound coil spring 82 on the support element 52.

The second axial section 78 of the actuation rod 66 extends through the opening 54 of the support element 52.

At an axial position being arranged on an opposite side of the support element 52 with respect to the biasing element 80, the actuation rod 66 comprises an abutment element 88.

The abutment element is a ring-shaped disc which extends around a circumference of the second axial section 78 of the actuation rod 66.

The abutment element 88 is configured to abut against the guide part 40, more precisely against the support element 52, in an unactuated position of the actuation rod 66 (cf. FIG. 6).

In order to dampen such an abutment, another dampening means 90 is arranged on a surface of the support element 52 facing the abutment element 88.

As before, the dampening means 90 is a ring-shaped rubber disc 92.

Altogether, the actuation rod 66 is movable relative to the guide part 40 between a fully actuated position (cf. FIG. 7) and an unactuated position (cf. FIG. 6).

Figure 7:
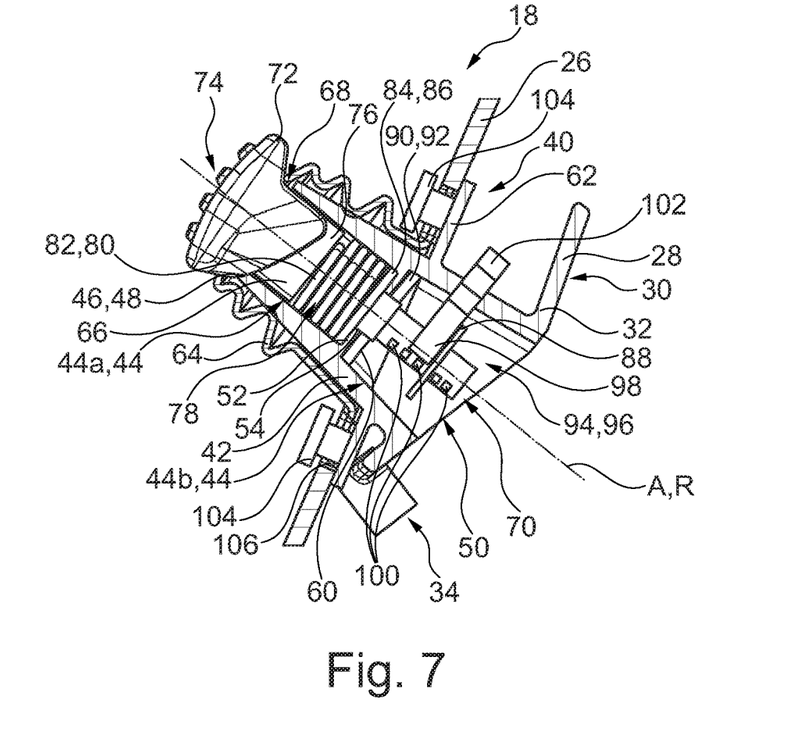
FIG. 7 shows the pedal assembly of FIG. 6 in a fully actuated state.

In an unactuated position, the abutment element 88 abuts against the support element 52 via rubber disc 92. In the fully actuated position, the first axial section 76 abuts against the support element via the wound coil spring 82 and the rubber disc 86.

The actuation rod 66 is biased towards the unactuated position by the wound coil spring 82.

The pedal assembly 18 further comprises a sensor assembly 94.

In the example of FIGS. 4 to 8, the sensor assembly 94 comprises a travel sensor 96.

The travel sensor 96 is configured to detect a displacement of the actuation rod 66.

In the present example, the travel sensor 96 comprises a detector coil 98 and a plurality of magnetic elements 100.

The magnetic elements 100 are integrated into the actuation rod 66 or mounted thereon. The detector coil 98 is attached to the guide part 40. Consequently, using the detector coil 98 and the magnetic elements 100, a position of the actuation rod 66 may be detected and a corresponding sensor signal may be provided to the control unit 20 via an electric communication interface 102.

More generally speaking, the sensor assembly 94 is configured to detect an actuation of the actuation rod 66 along the rod axis R.

The pedal assembly 18 further comprises the sealing means 64 (also shown in FIG. 4).

The sealing means 64 is configured to protect a contact region between the actuation rod 66 and the guide part 40 against undesired environmental influences such as humidity.

In the present example, the sealing means 64 is sleeve-shaped and extends around the circumference of the actuation rod 66 and the guide part 40.

A first end of the sealing means 64 is attached to the actuation rod 66 at a position adjacent to the first end 68 of the actuation rod 66. It is understood that the sealing means 64 is connected to the actuation rod 66 in a water-tight manner.

A second end of the sealing means 64 being arranged opposite the first end of the sealing means 64 is connected to the guide part 40, more precisely to the connection collar 62.

It is understood that also the connection between the sealing means 64 and the guide part 40 is water-tight.

In the present example, the sealing means 64 is connected to the connection collar 62 using two bolts 104.

Moreover, the same bolts 104 are used for connecting the carpet 26 to the guide part 40.

To this end, the second end of the sealing means 64 is formed as an attachment collar 106 which is directly placed on the connection collar 62.

The carpet 26 is placed over the attachment collar 106.

Then, both the carpet 26 and the attachment collar 106 are compressed against the connection collar 62 using the bolts 104.

As has been mentioned before, FIG. 6 shows the pedal assembly 18 in the unactuated state, whereas FIG. 7 shows the pedal assembly 18 in the fully actuated state.

When comparing these two states, it can be seen that the actuation rod 66 performs a purely translatory movement along the rod axis R and along the channel axis A when being operated. The portions of the actuation rod 66 being arranged inside the channel 44 guide this movement together with the channel 44. A relative position of the actuation rod 66 with respect to the guide part 40 is detected using the sensor assembly 94.

Figure 8:
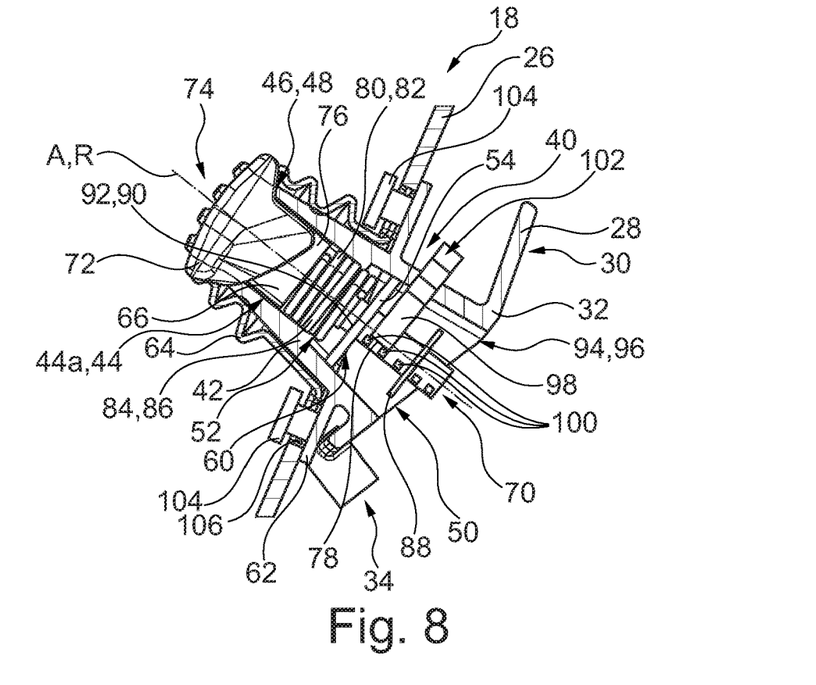
FIG. 8 shows the pedal assembly of FIGS. 6 and 7 in a crash state.

If the vehicle 10 is involved in a crash which leads to the fact that an excessive force is applied on the actuation rod 66, the predetermined breaking zone 60 breaks such that the actuation rod 66 can travel even further into the guide piece 40 than in the fully actuated position.

Thereby, space in the footwell area 24 is increased.

In the present context, an excessive force is to be understood as a force having a substantially higher magnitude than a force being applied to the actuation rod 66 during normal operation.

Figure 9:
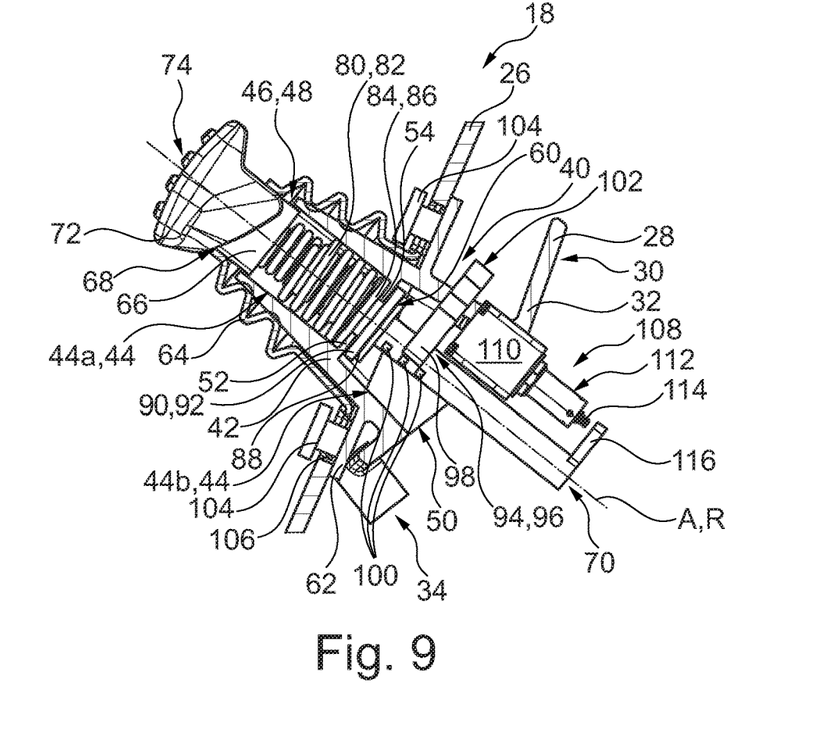
FIG. 9 shows another example of the pedal assembly in a sectional view, wherein the pedal assembly is in an unactuated state.
Figure 10:
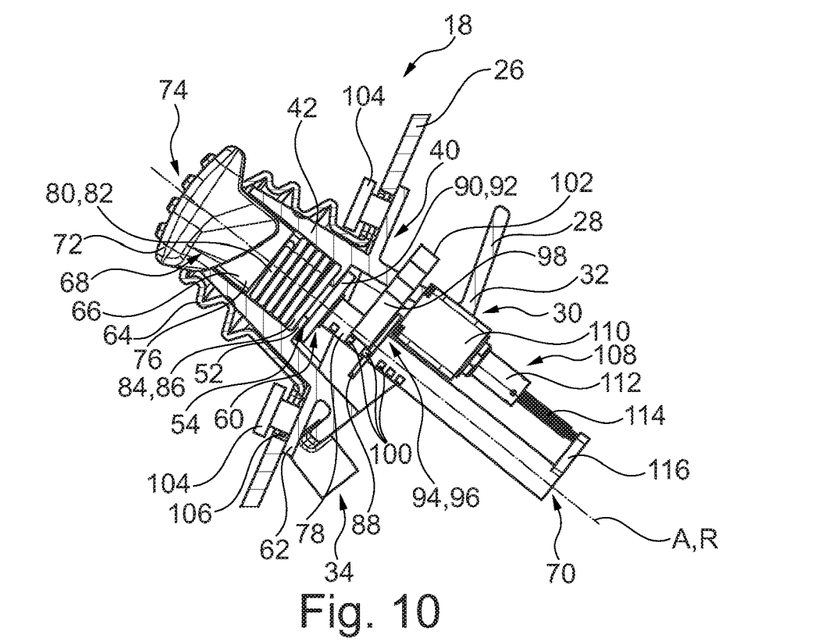
FIG. 10 shows the pedal assembly of FIG. 9, wherein the pedal assembly is in a retracted state.
Figure 11:
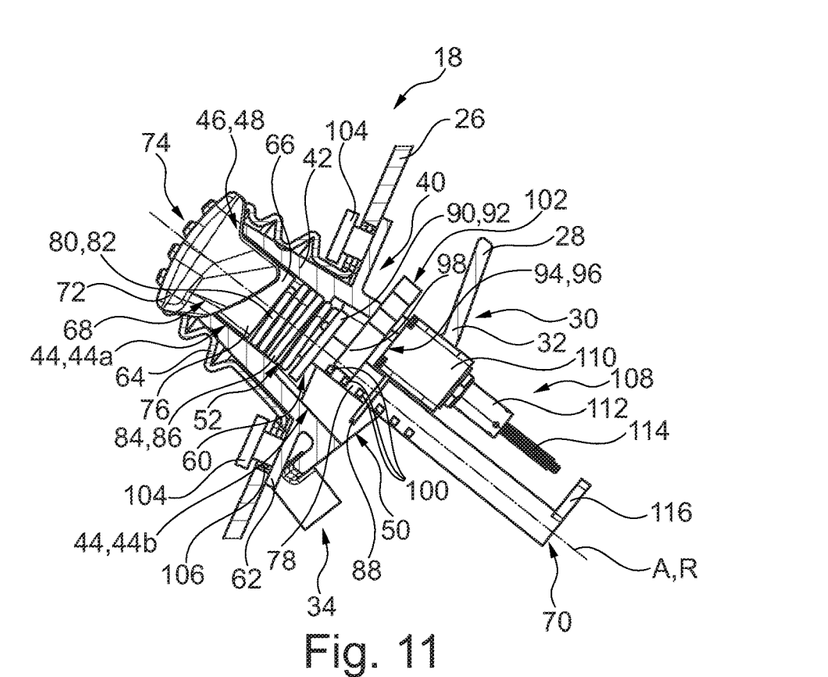
FIG. 11 shows the pedal assembly of FIGS. 9 and 10 in a crash state.

FIGS. 9 to 11 show a second example of the pedal assembly 18.

In the following, only the differences with respect to the pedal assembly 18 of the first example will be explained. Beyond that, reference is made to the above explanations which apply mutatis mutandis to the second example.

In the second example, the pedal assembly comprises a retraction actuator 108 being coupled to the guide part 40.

More precisely, the retraction actuator 108 comprises an electric step motor 110 to which a transmission unit 112 is connected.

The transmission unit 112 couples the electric step motor 110 to a pushrod 114.

Thus, by operating the electric step motor 110, the pushrod 114 can be selectively moved out of the transmission unit 112 and can be selectively moved into the transmission unit 112.

As far as the actuation rod 66 is concerned, in the second example, the second axial portion 78 is longer than in the first example. Beyond that, an actuation plate 116 is provided at the second end 70 of the actuation rod 66. The actuation plate 116 extends in a radial direction.

Thus, in the second example, a portion of the first axial section 76 and a portion of the second axial section 78 of the actuation rod 66 are arranged inside the channel 44. The second end 70 is arranged outside the channel 44.

The actuation plate 116 and the pushrod 114 are arranged such that the pushrod 114 may push against the actuation plate 116 when being moved out of the transmission unit 112.

Consequently, the actuation rod 66 can be moved into a retracted position by operating the retraction actuator 108.

It is understood that the retraction actuator 108 is sufficiently powerful such that it can move the actuation rod against the biasing force of the biasing element 80.

Moving the actuation rod 66 into the retracted position may be used in a situation in which the vehicle 10 is operated in a fully or partially autonomous driving mode in which an operation of the pedal assembly 18 by a foot of the driver is not necessary. Due to the fact that the actuation rod 66 is in the retracted position, more space for the driver's foot is available in the footwell area 24.

If the retraction actuator 108 is not used, i.e., if the pushrod 114 is located inside the transmission unit 112, the pedal assembly 18 according to the second example can be operated as has been explained in connection with the first example.

As far as the position of the actuation rod 66 is concerned, the fully actuated position of the actuation rod 66 corresponds to the retracted position of the actuation rod 66.

As before, the predetermined breaking zone 60 may break if the vehicle is involved in the crash and an excessively high force is applied to the thrust piece and/or actuation rod 66. In such a case, the predetermined breaking zone 60 allows the actuation rod to travel even further into the guide piece 40 than in the fully actuated position.

It is noted that this functionality of the predetermined breaking zone 60 is available independent from the fact whether the pedal assembly 18, more precisely the actuation rod 66, is in a retracted position or not.

Figure 12:
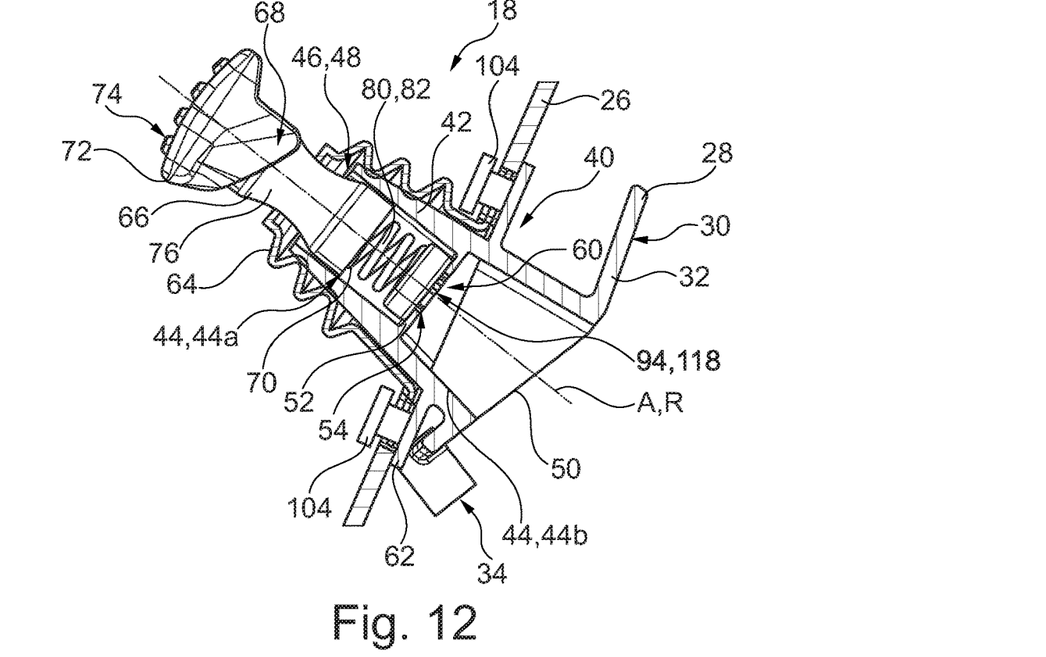
FIG. 12 shows a further example of the pedal assembly in a sectional view, wherein the pedal assembly is in an unactuated state.
Figure 13:
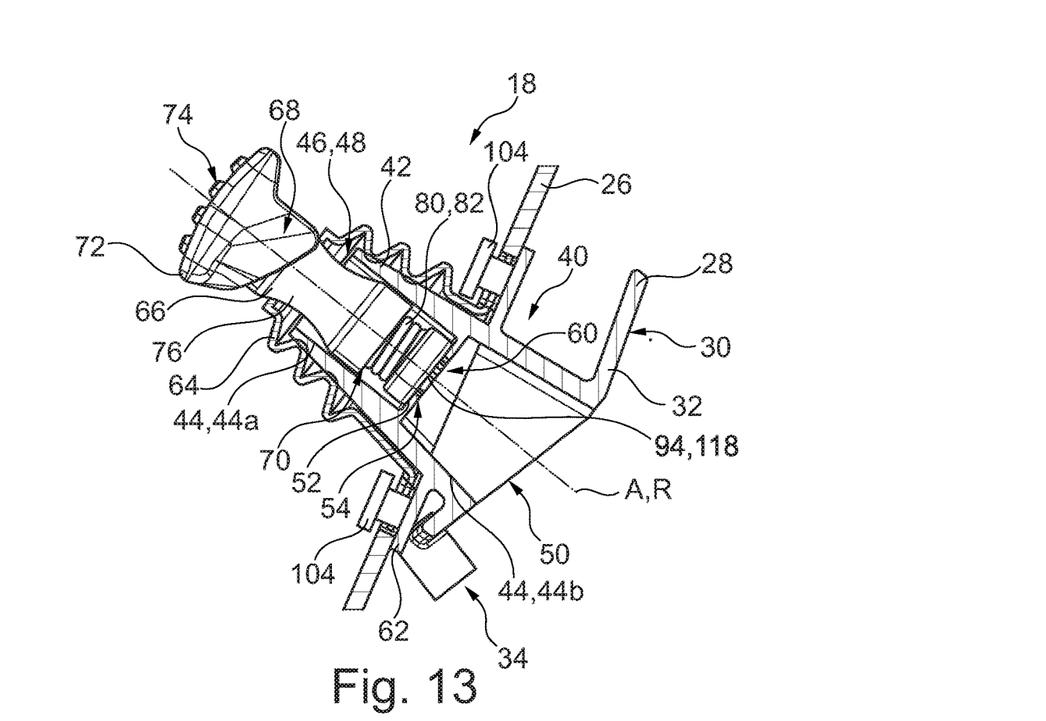
FIG. 13 shows the pedal assembly of FIG. 9, wherein the pedal assembly is in a fully actuated state.
Figure 14:
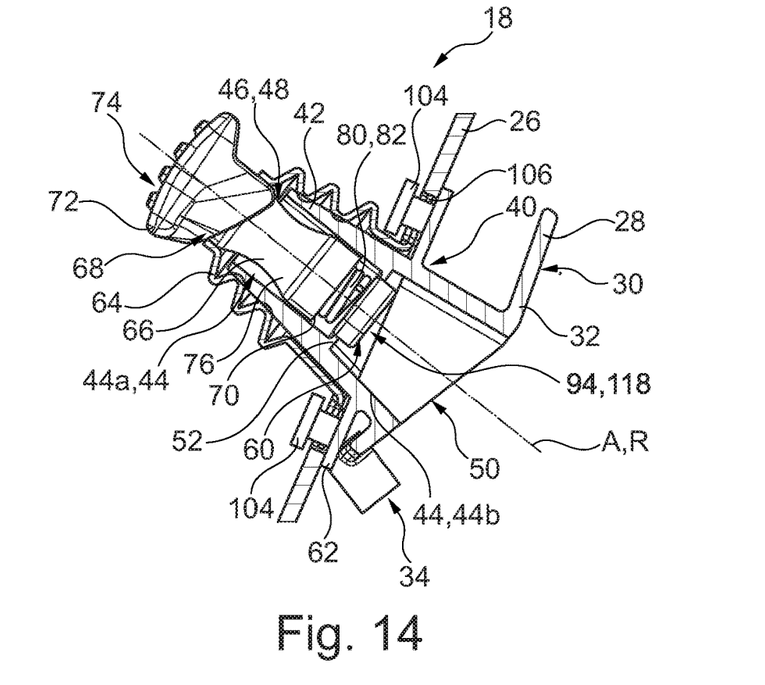
FIG. 14 shows the pedal assembly of FIGS. 12 and 13 in a crash state.

FIGS. 12 to 14 show a third example of the pedal assembly 18.

In the following, only the differences with respect to the pedal assembly 18 of the first example and the second example will be explained. Beyond that, reference is made to the above explanations which apply mutatis mutandis to the third example.

The first difference lies in the fact that instead of the travel sensor, the sensor assembly 94 comprises a force sensor 118.

The force sensor 118 is shaped as a cylindrical disc and is supported on the same side of the support element 52 as the biasing element 80. More precisely, the force sensor 118 is located between the biasing element 80 and the support element 52.

As compared to the previous examples, the biasing element 80, which again is a wound coil spring 82, is shorter in an axial direction.

Also, the actuation rod 66 is shorter in the third example. Here, the actuation rod neither extends through the wound coil spring 82 nor through the opening 54 of the support element 52. Rather, the second end 70 of the actuation rod 66 axially contacts the wound coil spring 82.

Thus, the wound coil spring 82 is arranged between the second end 70 of the actuation rod 66 and the force sensor 118.

Even though the actuation rod comprises a varying diameter along its axial extension, the actuation rod 66 may be considered to comprise one axial section only between its first axial end 68 and its second axial end 70.

Moreover, the actuation rod 66 does not comprise an abutment element 88 in the third example.

When operating the pedal assembly 18, a user will push the actuation rod 66 towards the support element 52 thereby compressing the wound coil spring 82.

In this context, the force sensor 118 will output a detection result from which a magnitude of the force by which the pedal assembly 18 is actuated, i.e., a force that is applied to the pushing surface 74 can be read. This detection result can be fed into the control unit 20 such that the brake actuator 16 can be operated accordingly.

As in the previous examples, the predetermined breaking zone 60 allows the actuation rod 66 to travel further into the guide part 40 than in the fully actuated position.

It is noted that even though in the third example, a maximum travel path of the actuation rod 66 extending between the un-actuated position and the fully actuated position is shorter than in the first and the second example and even though no retraction actuator is represented in FIGS. 12 to 14, it is of course possible to modify the third example such that also in this context, a retraction actuator 108 may be provided and the actuation rod 66 may be selectively moved into a retracted position.

Figure 15:
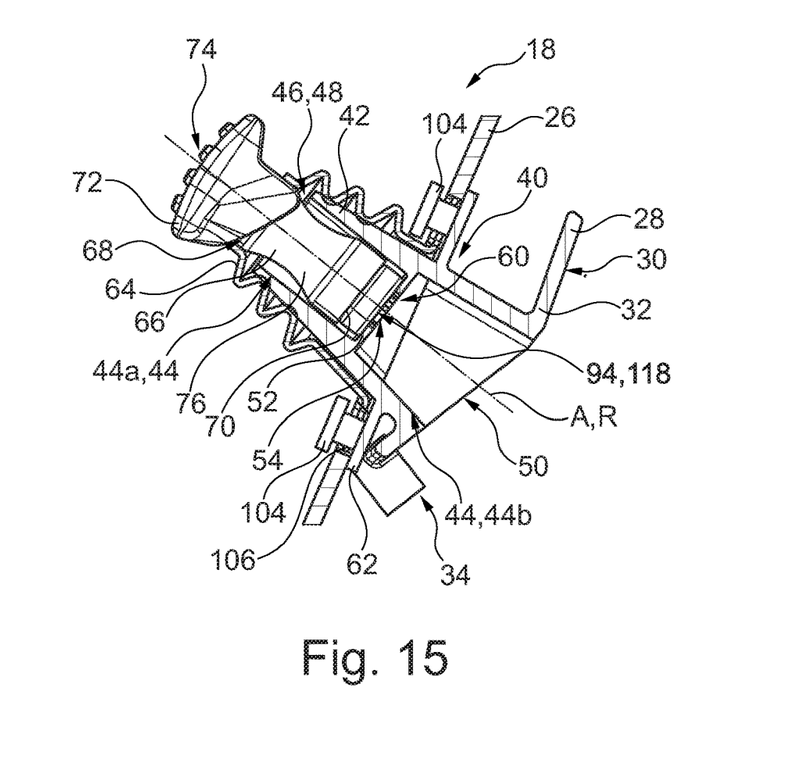
FIG. 15 shows a further example of the pedal assembly in a sectional view.
Figure 16:
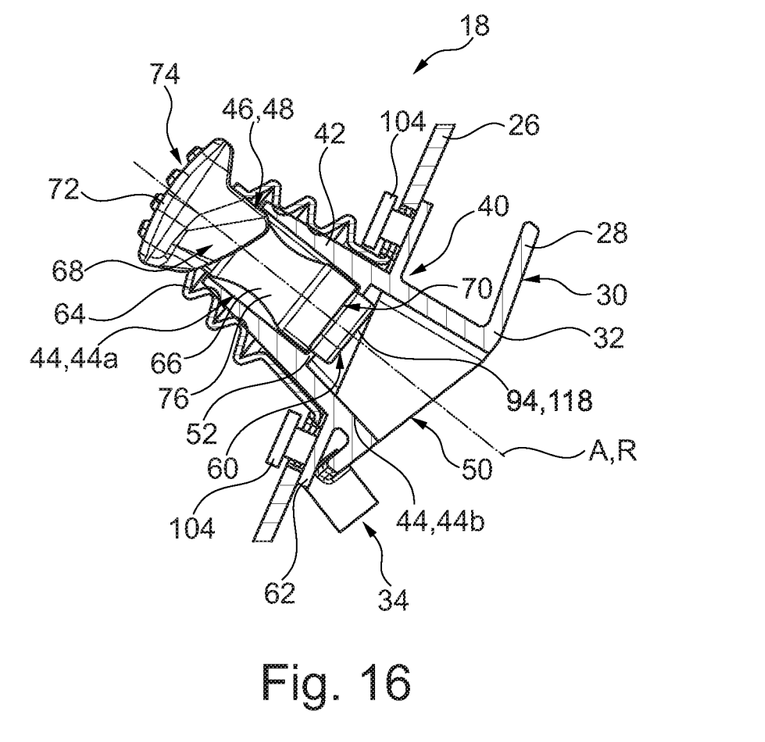
FIG. 16 shows the pedal assembly of FIG. 15 in a crash state.

FIGS. 15 and 16 show a fourth example of the pedal assembly 18.

In the following, only the differences with respect to the pedal assembly 18 of the previous examples will be explained. Beyond that, reference is made to the above explanations which apply mutatis mutandis to the fourth example.

The pedal assembly 18 according to the fourth example is a variation of the pedal assembly 18 according to the third example which has been explained in connection with FIGS. 12 to 14.

In contrast to the third example, in the fourth example, the biasing element 80 has been eliminated.

Consequently, the second end 70 of the actuation rod 66 directly contacts the force sensor 118.

In the fourth example, the actuation rod 66 does not change its position when being operated. This means that the position of the actuation rod 66 is the same whether the actuation rod 66 is unactuated or fully actuated. Thus, FIG. 15 may be considered to represent both the fully actuated position and the un-actuated position of the actuation rod 66.

The pedal assembly 18 according to the fourth example is able to detect a force that is applied to the pushing surface 74 and is able to provide a corresponding detection result to the control unit 20 as has been explained in connection with the third example. In order to perform this functionality, a movement of the actuation rod 66 is not necessary.

Also in the fourth example, the predetermined breaking zone 60 allows the actuation rod 66 to travel further into the guide part 40 in a crash situation.

In the following, a method for mounting the pedal assembly 18 to the vehicle 10 will be explained. These explanations applied to all of the examples of the pedal assembly 18.

When mounting the pedal assembly 18 to the vehicle 10, the guide part 40, the mounting bracket 28, the actuation rod 66 and the sensor assembly 94 are provided as a pre-mounted subassembly.

In a case in which the pedal assembly 18 comprises a biasing element 80, the biasing element 80 also forms part of the pre-mounted subassembly.

In a case in which the pedal assembly 18 comprises a retraction actuator 108, the retraction actuator 108 also forms part of the pre-mounted subassembly.

Based thereon, in a first step, the pre-mounted subassembly is mounted on the structural part of the vehicle 10 by putting bolts 38 through the openings 36 of the mounting bracket 28.

Then, the sealing means 64 can be pulled over the guide part 40 and abutted against the connection collar 62.

Subsequently, the carpet 26 is arranged in the footwell area 24 and placed over the pedal assembly 18 such that the guide part 40 extends through an opening in the carpet 26 and the rim of this opening contacts the attachment collar 106 of the scaling means 64.

Thereafter, the carpet 26 and the attachment collar 106 of the scaling means 64 are attached to the connection collar 62 of the guide part 40 using bolts 104. The heads of these bolts 104 press the carpet 26 and the attachment collar 106 of the sealing means 64 against the connection collar 62.

In a next step, thrust piece 72 is connected to the first end 68 of the actuation rod 66. In the present example, the thrust piece 72 is clicked on the first end 68 of the actuation rod 66.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein the term "component" refers to a distinct and identifiable part, element, subsystem, or unit within a larger system, structure, or entity. It is a building block that serves a specific function or purpose within a more complex whole. Components are often designed to be modular and interchangeable, allowing them to be combined or replaced in various configurations to create or modify systems. Components may be a combination of mechanical, electrical, hardware, firmware, software and/or other engineering elements.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

LIST OF REFERENCE SIGNS 10 vehicle
12 drive-by-wire system 14 brake-by-wire system
16 brake actuator
18 pedal assembly
20 control unit
22 electric accelerator pedal
24 footwell area
26 carpet
28 mounting bracket
30 mounting interface
32 central carrier portion
34 leg portion
36 opening of the mounting bracket
38 bolt
40 guide part
42 main body
44 channel
44a first portion of the channel
44b second portion of the channel
46 first axial end of the channel
48 opening
50 second axial end of the channel
52 support element
54 opening of the support element
56 slot
58 tongue
60 predetermined breaking zone
62 connection collar
64 sealing means
66 actuation rod
68 first end of the actuation rod
70 second end of the actuation rod
72 thrust piece
74 pushing surface
76 first axial section of the actuation rod
78 second axial section of the actuation rod
80 biasing element
82 wound coil spring
84 dampening means
86 rubber disc
88 abutment element
90 dampening means
92 rubber disc
94 sensor assembly
96 travel sensor
98 detector coil
100 magnetic element
102 electric communication interface
104 bolt
106 attachment collar
108 retraction actuator
110 electric step motor
112 transmission unit
114 pushrod
116 actuation plate
118 force sensor
A channel axis
R rod axis

What is claimed is:

1. A pedal assembly comprising,
a mounting bracket comprising a mounting interface for mechanically attaching the pedal assembly to a structural part of a vehicle,
a guide part being fixedly connected to the mounting bracket and comprising a channel extending linearly along a channel axis,
an actuation rod extending along a rod axis and having a first end comprising or being coupled to a pushing surface, wherein at least a portion of the actuation rod is located inside the channel, wherein the rod axis and the channel axis are parallel and wherein the pushing surface is configured to be contacted by a human foot for operating the pedal assembly,
a sensor assembly configured to detect an actuation of the actuation rod along the rod axis; and
wherein the guide part comprises a support element being arranged in the channel, wherein the actuation rod is axially supported on the support element; and
wherein the support element comprises at least one predetermined breaking zone.

2. The pedal assembly of claim 1, wherein the pedal assembly is a brake pedal assembly.

3. The pedal assembly of claim 1, wherein the support element comprises an opening and wherein the actuation rod extends through the opening.

4. The pedal assembly of claim 1, wherein the predetermined breaking zone comprises a plurality of slots.

5. The pedal assembly of claim 1, wherein the pedal assembly further comprises a biasing element biasing the actuation rod into an unactuated position.

6. The pedal assembly of claim 5, wherein the biasing element is supported on the support element.

7. The pedal assembly of claim 6, wherein the actuation rod comprises an abutment element being configured to abut against the guide part in an unactuated position of the actuation rod.

8. The pedal assembly of claim 1, wherein the sensor assembly comprises a travel sensor being configured to detect a displacement of the actuation rod, wherein the displacement is the actuation.

9. The pedal assembly of claim 1, wherein the sensor assembly comprises a force sensor configured to detect a force being applied to the actuation rod, wherein the force being applied is the actuation.

10. The pedal assembly of claim 1, wherein the pedal assembly further comprises a sealing means being connected to the actuation rod and the guide part or the mounting bracket such that a contact region between the actuation rod and the guide part is protected against environmental influences.

11. The pedal assembly of claim 10, wherein the sealing means is sleeve-shaped and extends around a circumference of the actuation rod and the guide part.

12. The pedal assembly of claim 1, wherein the pedal assembly further comprises a retraction actuator being coupled to the guide part or the mounting bracket and being configured to selectively move the actuation rod towards an interior of the channel.

13. The pedal assembly of claim 1, wherein the pedal assembly is a component of a drive-by-wire system.

14. The pedal assembly of claim 13, wherein the drive-by-wire system is a component of the vehicle.

15. The pedal assembly of claim 1, wherein the pedal assembly is communicatively connected to a control unit.

16. The pedal assembly of claim 15, wherein an actuator is communicatively connected to the control unit, wherein the actuator is a brake actuator; and wherein the actuator is operated as a function of the actuation.

17. A method comprising,
mounting a pre-mounted subassembly on a structural part of a vehicle in a footwell area by fixing a mounting bracket to the structural part, wherein the pre-mounted subassembly comprises a guide part, the mounting bracket, an actuation rod, and a sensor assembly;

pulling a sealing over the guide part and abutting against a connection collar forming a pedal assembly;

placing a carpet over the pedal assembly such that the guide part extends through an opening in the carpet and a rim of this opening contacts an attachment collar of the sealing;

attaching the carpet and the attachment collar of the sealing to the connection collar of the guide part using one or more bolts, wherein heads of the bolts press the carpet and the attachment collar of the sealing against the connection collar;

connecting a thrust piece comprising a pushing surface to a first end of the actuation rod; and wherein the method is configured for mounting the pedal assembly in the vehicle.

18. The method of claim 17, wherein the pre-mounted subassembly further comprises one or more of a biasing element and a retraction actuator.

\* \* \* \* \*